United States Patent Office 2,854,597
Patented Sept. 30, 1958

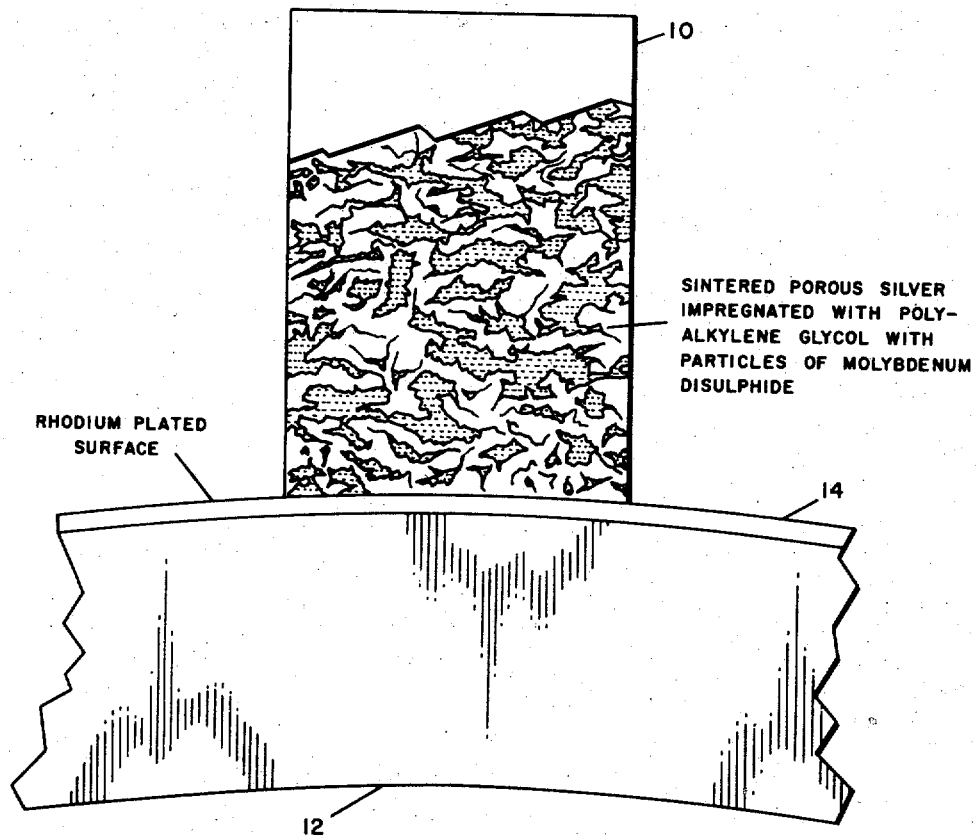

2,854,597
LUBRICATION OF RUBBING SURFACES

Theodore Foote, Oak Park, Murray Kanes, Birmingham, and Kenneth W. Verge, Dearborn, Mich., assignors to Bendix Aviation Corporation, Detroit, Mich., a corporation of Delaware Application January 24, 1955, Serial No. 483,814

7 Claims. (Cl. 310—228)

This invention relates to the lubrication of rubbing surfaces and more particularly to the lubrication of rubbing surfaces between conductive members such as brushes and collector rings in electrical apparatus.

For many applications brushes are made from carbon and collector rings are made from copper. When there is adequate moisture in the atmosphere, the presence of this moisture at the contact surfaces between the brush and the ring causes the carbon or graphite in the brush to act as a good lubricant. However, when sufficient moisture is lacking in the atmosphere, the carbon without moisture is abrasive and causes disintegration or "dusting" of the brush and also causes cutting and burning of the collector rings. In this way, weather conditions affect the life and reliability of brushes and rings in electrical apparatus.

This invention provides for reliable lubrication between brushes and rings under all atmospheric conditions. The brush is made of a porous, conductive material which is impregnated with a liquid vehicle containing particles of a dry lubricant and the collector ring is plated with a hard, conductive material. The dry lubricant is carried by the liquid vehicle to the contact surfaces between the brush and the ring to lubricate the surfaces.

An object of this invention is to provide lubrication for rubbing surfaces.

Another object of this invention is to provide lubrication for rubbing surfaces between electrical conductors.

A further object of this invention is to provide a brush comprising a conductive material impregnated with a liquid vehicle containing particles of a dry lubricant and to provide a collector ring or commutator plated with a hard, conductive material.

Other objects and advantages will be apparent from the following detailed description of the invention and from the appended claims.

The single figure is a drawing of a brush in contact with a collector ring.

In one embodiment of the invention, a brush 10 is formed from a material which is suitably conductive and porous. For example, it has been found that a very desirable brush may be formed from powdered silver which has been pressed in a die and later sintered in an oven.

The brush 10 is then impregnated with a liquid vehicle having a low residue when volatilized and which contains particles of a dry lubricant. Polyalkylene glycol containing particles of molybdenum disulphide has been found to be a highly satisfactory impregnant. Particles of silver sulphate may be used as the lubricant instead of molybdenum disulphide. The porous, sintered silver serves as a reservoir for the polyalkylene glycol which serves as a vehicle for carrying the molybdenum disulphide to the brush surface to lubricate its contact with a collector ring 12.

The collector ring adapted to operate best with the above described brush should be provided with an extremely hard, conductive surface 14. It has been found that a rhodium plated collector ring provides excellent results.

The invention disclosed above is advantageous in that the brush does not disintegrate or "dust" with changes in weather conditions as occurs with carbon brushes. This is instrumental in providing a brush and ring combination which has long life and trouble free operation. Furthermore, the rubbing surface between the brush and the ring is always well lubricated because of the excellent lubricating qualities of the molybdenum disulphide which is constantly fed to the rubbing surface by the polyalkylene glycol.

Although this invention has been disclosed and illustrated with reference to a particular application, the principles involved are susceptible of numerous other applications which will be apparent to persons skilled in the art. The invention is, therefore, to be limited only as indicated by the scope of the appended claims.

What is claimed is:

1. In combination, a first conductive member having its surface plated with rhodium, a second conductive member comprising silver in porous form, the second member being impregnated with polyalkylene glycol, particles of molybdenum disulphide in the glycol to be carried by the glycol to the surface of the second member for lubricating any contact between the first and second members.

2. In combination, a first member having its surface plated with rhodium, a second member comprising silver in porous form, the second member being impregnated with polyalkylene glycol, particles of molybdenum disulphide in the glycol for being fed to the surface of the second member by the glycol to lubricate any contacting surfaces between the first and second members.

3. A finished brush comprising a conductive material in porous form, a liquid impregnant in the conductive material, and particles of a dry lubricant in the liquid, the particles being carried by the liquid to the surface of the conductive material to lubricate its contact with any other surface.

4. A finished brush comprising a metal in porous form, a liquid impregnant in the metal, and particles of a dry lubricant in the liquid, the particles being carried by the liquid to the surface of the metal to lubricate its contact with any other surface.

5. A finished brush comprising silver in porous form, a liquid impregnant in the silver and particles of a dry lubricant in the liquid, the particles being carried by the liquid to the surface of the silver to lubricate its contact with any other surface.

6. A finished brush comprising silver in porous form, a liquid impregnant of polyalkylene glycol in the silver and particles of molybdenum disulphide in the glycol, the particles of molybdenum disulphide being carried by the glycol to the surface of the silver to lubricate its contact with any other surface.

7. In combination a collector ring or a commutator having its surface plated with an extremely hard and conductive material, a brush comprising a conductive material in porous form, a liquid impregnant in the conductive material, and particles of a dry lubricant in the liquid, the particles being carried by the liquid to the surface of the conductive material to lubricate its contact with the collector ring or commutator.

References Cited in the file of this patent

UNITED STATES PATENTS

| | | |
|---|---|---|
| 1,246,825 | Ster | Nov. 13, 1917 |
| 2,062,370 | Miller | Dec. 1, 1936 |

(Other references on following page)

UNITED STATES PATENTS

| | | |
|---|---|---|
| 2,244,436 | Tietig | June 3, 1941 |
| 2,250,099 | Hensel | July 22, 1941 |
| 2,412,701 | Williford | Dec. 17, 1946 |
| 2,414,514 | Elsie | Jan. 21, 1947 |
| 2,418,810 | Alger | Apr. 15, 1947 |
| 2,428,036 | Peters | Sept. 30, 1947 |
| 2,547,658 | Palme | Apr. 3, 1951 |
| 2,656,475 | Diehl | Oct. 20, 1953 |
| 2,696,570 | Pandapas | Dec. 7, 1954 |

FOREIGN PATENTS

| | | |
|---|---|---|
| 453,858 | France | Apr. 15, 1913 |
| 522,092 | France | Mar. 21, 1921 |
| 458,829 | Great Britain | Dec. 28, 1936 |
| 464,920 | Great Britain | Apr. 21, 1937 |